United States Patent
Al-Naser et al.

(10) Patent No.: US 10,956,145 B2
(45) Date of Patent: Mar. 23, 2021

(54) SYSTEM AND METHOD FOR DETERMINING DYNAMIC DEPENDENCIES FOR ENTERPRISE IT CHANGE MANAGEMENT, SIMULATION AND ROLLOUT

(71) Applicant: Saudi Arabian Oil Company, Dhahran (SA)

(72) Inventors: Aqeel Abdulaziz Al-Naser, Dhahran (SA); Murtadha Ibrahim Al-Habib, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/253,949

(22) Filed: Jan. 22, 2019

(65) Prior Publication Data
US 2020/0233652 A1      Jul. 23, 2020

(51) Int. Cl.
| | |
|---|---|
| G06F 9/44 | (2018.01) |
| G06F 9/45 | (2006.01) |
| G06F 9/445 | (2018.01) |
| G06F 8/65 | (2018.01) |
| G06F 8/75 | (2018.01) |

(52) U.S. Cl.
CPC . *G06F 8/65* (2013.01); *G06F 8/75* (2013.01)

(58) Field of Classification Search
CPC .................................. G06F 8/65; G06F 8/75
See application file for complete search history.

(56) References Cited

U.S. PATENT DOCUMENTS

| | | | |
|---|---|---|---|
| 7,337,184 B1 | 2/2008 | Yan et al. | |
| 7,505,872 B2 * | 3/2009 | Keller | G06F 11/0709 702/186 |
| 7,507,872 B2 * | 3/2009 | Akira | A61P 37/08 800/18 |
| 7,546,221 B2 | 6/2009 | Moon et al. | |
| 9,913,069 B2 * | 3/2018 | Naqvi | H04W 8/18 |

(Continued)

FOREIGN PATENT DOCUMENTS

WO        2012126089 A1     9/2012

OTHER PUBLICATIONS

Alexia Schulz, Active Dependency Mapping, 2017, pp. 84-91. https://ieeexplore.ieee.org/starmp/stamp.jsp?tp=&arnumber=8102923 &isnumber=8102895 (Year: 2017).*

(Continued)

*Primary Examiner* — Mongbao Nguyen
(74) *Attorney, Agent, or Firm* — Leason Ellis LLP (57) ABSTRACT

A method of managing a selected change to an IT (information technology) system comprises obtaining an inventory of all components available to the IT system, assigning each of the components in the inventory to a component class, identifying relationships between the components in the IT system, defining attributes of the relationships, generating a complete dependency mapping of the components of the IT system based on the relationships, cross-relationships and constraints, simulating the selected change within a processor of the IT system to one or more of the IT components using the dependency mapping to generate a change impact analysis, and automatically updating impacted IT components via at least one authenticating agent executing on the IT system.

12 Claims, 8 Drawing Sheets

(56) References Cited

U.S. PATENT DOCUMENTS

| | | |
|---|---|---|
| 2003/0187967 A1 | 10/2003 | Walsh et al. |
| 2007/0100712 A1 | 5/2007 | Kilpatrick et al. |
| 2008/0201705 A1 | 8/2008 | Wookey et al. |
| 2011/0225103 A1* | 9/2011 | Clarke ................... G06Q 10/06 705/347 |
| 2012/0166597 A1* | 6/2012 | Babey ...................... G06F 8/61 709/220 |
| 2012/0167094 A1 | 6/2012 | Suit |
| 2013/0132553 A1* | 5/2013 | Stratton ................. H04L 41/50 709/223 |
| 2015/0067635 A1* | 3/2015 | Chen ..................... G06Q 10/06 717/102 |
| 2016/0269312 A1* | 9/2016 | Cavalcante ........ G06Q 10/0631 |
| 2016/0274558 A1* | 9/2016 | Strohmenger ..... G05B 19/0428 |
| 2016/0373313 A1 | 12/2016 | Giri et al. |
| 2017/0024271 A1 | 1/2017 | Teli et al. |
| 2017/0039126 A1* | 2/2017 | Wood ........................ G06F 8/30 |
| 2017/0344363 A1 | 11/2017 | Chen et al. |
| 2019/0312794 A1* | 10/2019 | Bruun ..................... H04L 41/12 |
| 2019/0327154 A1* | 10/2019 | Sahoo ................... H04L 43/045 |
| 2019/0361686 A1* | 11/2019 | Gnazdowsky .......... G06F 8/433 |

OTHER PUBLICATIONS

Hoa Khanh Dam, Automated Change Impact Analysis for Agent Systems, 2011, pp. 33-42. https://ieeexplore.IEEE.org/stamp/stamp.jsp?tp=&arnumber=6080770&isnumber=6080759 (Year: 2011).*

Alexia Schulz, Active Dependency Mapping, 2017, pp. 84-91. https://ieeexplore.IEEE.org/stamp/stamp.jsp?tp=&arnumber=8102923&isnumber=8102895 (Year: 2017).*

Gruschke, B. "Integrated event management: Event correlation using dependency graphs" In Proceedings of the 9th IFIP/IEEE International Workshop on Distributed Systems: Operations & Management (DSOM 98), (Oct. 1998), (pp. 130-141).

International Search Report and Written Opinion in International Patent Application No. PCT/US2020/014318 dated Jun. 4, 2020. 11 pages.

* cited by examiner

SYSTEM AND METHOD FOR DETERMINING DYNAMIC DEPENDENCIES FOR ENTERPRISE IT CHANGE MANAGEMENT, SIMULATION AND ROLLOUT

FIELD OF THE INVENTION

The present invention relates to information technology (IT) systems, and, more particularly, relates to a system and method for determining dynamic dependencies of components of an IT system to facilitate and secure change management, simulation and rollout.

BACKGROUND OF THE INVENTION

Information technology (IT) systems in large organizations can be highly complex and subject to a high frequency of updates and changes. Changes can be made to hardware components such as facilities, computing and network devices, to software including middleware, APIs and user applications, and to configuration data, as examples. Due to the tight integration of the components in an IT system, even minor modifications to a specific layer of the IT system can result in a ramified chain reaction and can affect many other components that are not necessarily in a direct relation (i.e. dependency) with the modified component. Therefore, management of such modifications is an important function for IT support services. Conventionally, change management is a tedious and a semi-manual process. In an illustrative example, a shutdown of a physical server, e.g., for maintenance, can bring virtual servers hosted by the physical server down. Any services hosted by the virtual servers dependent on the inoperative physical server will be rendered inoperative as well.

Another major challenge for the IT change management process is its high dependency on human factors. This dependency is mainly related to the exclusive knowledge about specific relationships between different IT components that are known to specific individuals but not necessarily well known to others in the organization. It is therefore sometimes challenging to ensure that the requisite and rapidly deployable IT knowledge is maintained and applicable when needed to attend to IT problems, rollouts, or other configuration changes as they occur. In general, there is a risk that underestimation of the dependency of the components in an IT system could lead to outages of critical services with severe business impacts.

Additionally, conventional change management processes tend to lack an efficient change impact analysis. For example, accurate analysis of various "what if" scenarios analysis is typically not performed.

It would be useful to provide a process to streamline and optimize IT change management, particularly for organizations that manage a complex IT infrastructure. The present invention addresses these and other needs in the art.

SUMMARY OF THE INVENTION

Embodiments of the present invention provide a method of managing a selected change to an IT (information technology) system comprising obtaining an inventory of all components available to the IT system, assigning each of the components in the inventory to a component class, identifying relationships between the components in the IT system, defining attributes of the relationships, generating a complete dependency mapping of the components of the IT system based on the relationships, cross-relationships and constraints, simulating the selected change within a processor of the IT system to one or more of the IT components using the dependency mapping to generate a change impact analysis, and automatically updating impacted IT components via at least one authenticating agent executing on the IT system.

In some implementations, the attributes defined include cross-relationships, constraints and status. The constraints can include the number of dependee nodes that are required to be active to ensure that an outage does not occur in a dependent node dependent upon the dependee nodes.

The component class into which the components are assigned includes facilities, hardware, middleware, software, a configuration parameter, and user groups.

Some embodiments of the method further comprise the step of authenticating at least one agent to receive an updated configuration parameter prior to automatically updating impacted IT components.

Additional embodiments further comprise the step of identifying change conflicts if any two changes share a common node or path in the dependency mapping during a time frame.

In further embodiments, the relationships between the components are classified by relationship type after identifying the relationships. The relationship type includes categories: physically connected to, hosted in, configuration of, points to, supports and uses.

Embodiments of the present method can also provide for change registration and approval including steps of receiving a registration request from a support team responsible for a component of the IT system to approve the change. Also, generating an approval list required to implement the change upon receiving the registration request. In some implementations, the support teams responsible for the components affected by the change are contacted and the change is prevented from being implemented if one of the responsible support teams does not approve the change.

Embodiments of the present invention also provide a non-transitory computer-readable medium comprising instructions which, when executed by a computer system, cause the computer system to carry out a method of managing a selected change to an IT (information technology) system including any of the method steps recited above.

These and other aspects, features, and advantages can be appreciated from the following description of certain embodiments of the invention and the accompanying drawing figures and claims.

DETAILED DESCRIPTION OF CERTAIN EMBODIMENTS OF THE INVENTION

The disclosed invention provides a method for streamlining and optimizing IT change management by determining all possible effects of a change on any selected IT component efficiently and accurately, while eliminating human factor dependency. The method proceeds by classifying various IT components into abstract component classes (e.g., hardware, middleware, application software), acquiring an inventory of all IT components of an IT system, assigning all of the IT components within the system to one of abstract component classes, identifying relationships between the IT components, and classifying the relationships into relations classes including interconnected relationships. After the listing, assignment and categorization steps, a complete IT component dependency mapping of the IT system is constructed. The dependency mapping shows the dependencies of components in the IT system on each other, such as the dependence of a software application component on one or more middleware components.

Once the dependency relationships of the IT components have been determined, a change management simulation can be executed to assess the impact of a change to one or more IT components (e.g., hardware, middleware, software, configuration parameters) before executing the actual change. In addition, automatic update registration is available for automatic rollouts such as global configuration changes (e.g., new domain name system (DNS) addresses, and modifications to shared library paths). In automatic update registration, applications consuming such configurations can authenticate an agent to receive updated configuration parameters in case of a change. For scenarios in which automatic update is not possible, applications may register for a notification for a human to perform a manual update.

Additionally, a human group entity can subscribe to be an approver for any change that could cause an outage to its concerned (i.e. supporting) components. The subscription automatically generates an approval list for any change including all support teams of affected IT components.

Figure 1:
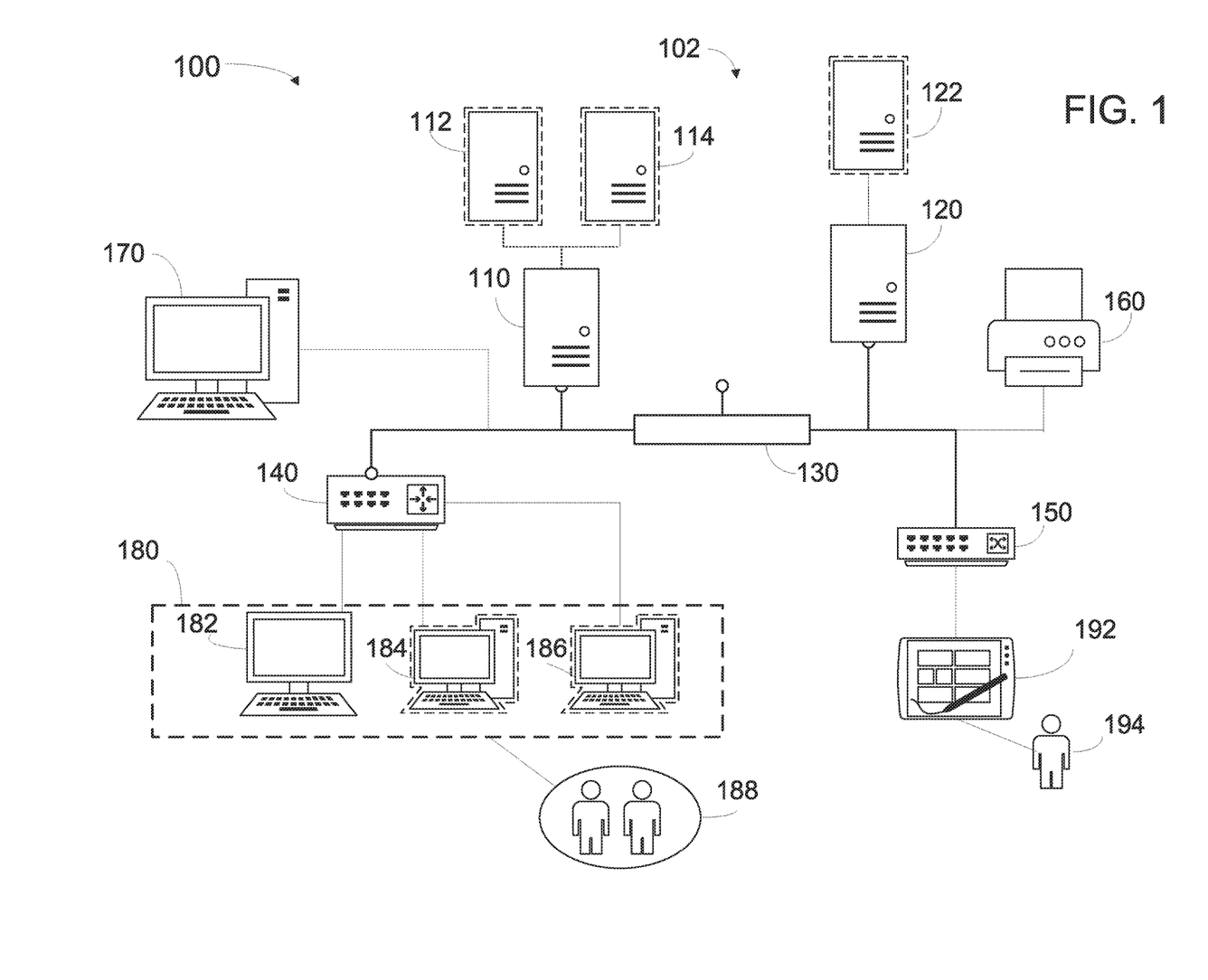
FIG. 1 is a schematic diagram of a simplified hardware arrangement at an exemplary IT facility.

A simplified example of a hardware arrangement at an IT facility is depicted FIG. 1. It is understood that the small number of components shown in FIG. 1 is for ease of illustration of the principles of the invention and not representative of the number of components in organizational IT systems to which the principles herein apply. The IT facility 100 shown includes a server sub-network 102 that includes a plurality of servers represented by a first physical server 110 and a second physical server 120. First physical server 110 hosts first and second virtual servers 112, 114 and second physical server 120 hosts a third virtual server 122. The first and second physical servers 110, 120 are coupled to a network hub 130, such as, but not limited to, an Ethernet hub. Also coupled to the network hub 130 are first and second network switches 140, 150, printer 160 and computing system 170 having at least one processor and memory which stores code executable by the processor. A user group 180 including computing devices 182, 184, 186, each with at least one processor and memory which stores code executable by the respective processor, is coupled to first network switch 140. User group 180 is supported by human support personnel 188. A portable device 192, controlled by individual user 194, is coupled to second network switch 150. In this manner, all of the components of the facility 100 are communicatively coupled to each other. In the example embodiment, computing system 170 stores or is capable of loading program code instructions for executing a method of change management in an IT system according to the present invention.

Figure 2:
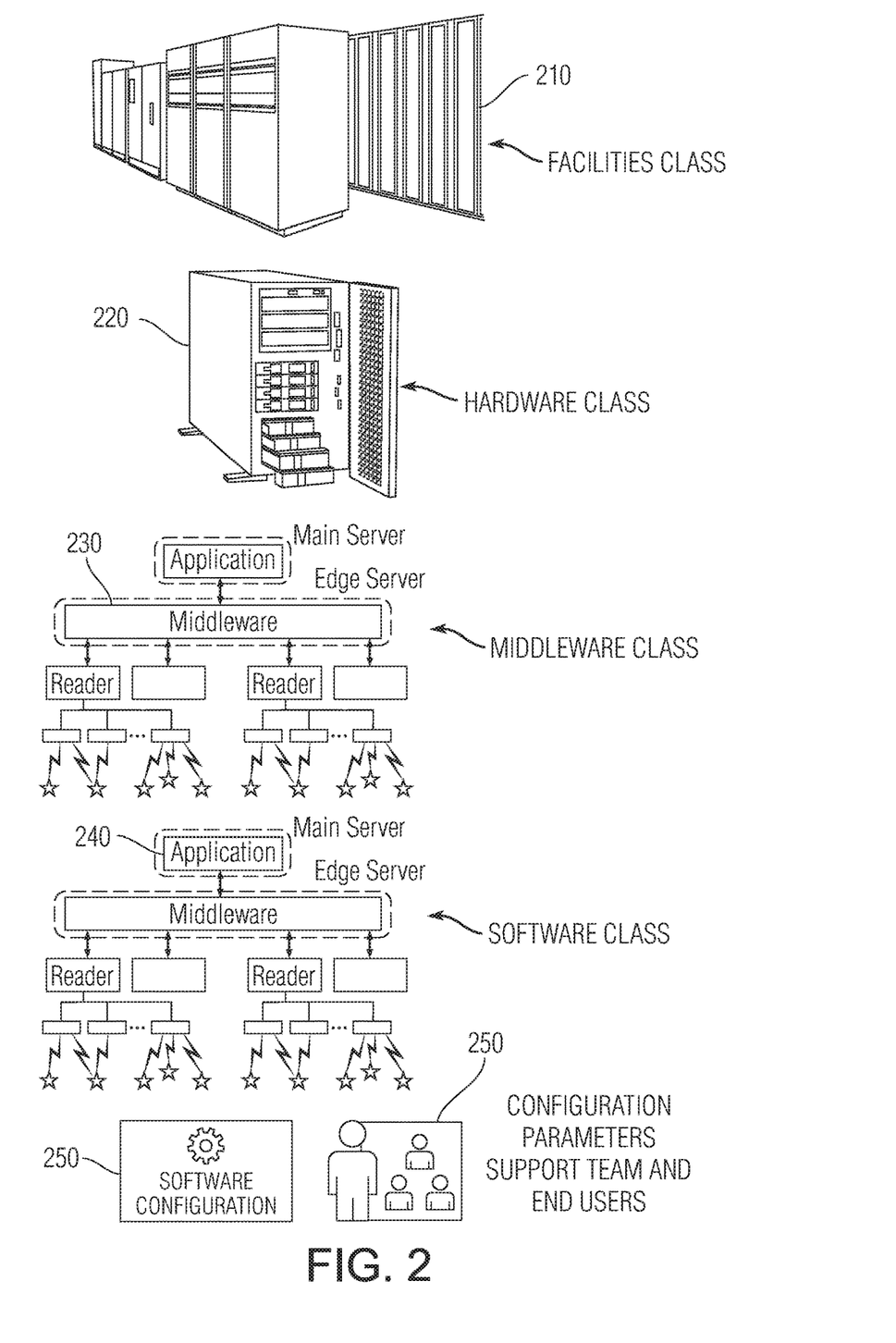
FIG. 2 is a schematic diagram that illustrates the various levels of abstract component classes in which IT components can be categorized according to the present invention.

The components of the facility 100 can interact in a complex manner at different layers and levels of abstraction. For example, virtual servers 112, 114, 122 can provide a platform for providing middleware and application services for client computing devices 182, 184, 186 in user group 180 and portable computing device 192. FIG. 2 shows the various levels of abstract component classes in which IT components can be categorized. The highest level is the facility class 210. An organization IT system can include numerous facilities at widespread locations. It can be useful at a first instance to classify an asset as located or hosted at a particular facility, when applicable. Below the facility class is the physical hardware class 220. The hardware class 220 includes all physical devices including mainframes, desktop and laptop computers, tablets, smart phones, network hubs, routers, switches, power supplies, memory devices, printers, scanners and other peripheral devices. The hardware class 220 can also include device operating systems such as for example, Windows, Unix, and iOS operating systems. The hardware class 220 provides the base computational and communication capability of the IT facility; however, the hardware class 220 does not completely determine how the components operate and interact, which is, rather, governed largely by components of the middleware class 230 and software class 240.

The middleware class 230 comprises the software layer that lies between the operating system and applications on each side of a distributed computing system in a network. Middleware typically includes web servers, application servers, content management systems, and similar tools that support application development and delivery. Middleware services can be particularly useful in an enterprise setting in which they can provide enterprise application integration and data integration. The software code, libraries, scripts for executing the middleware are stored by and executed using components of the hardware class 220. The software class 240 comprises the user-interfacing layer of software applications that provide functionality for the benefit of the end users. End users (human consumers) 260 can enter and adjust configuration parameters 250 that are used by the hardware, middleware and software classes to configure hardware and/or software functions according to user requirements. Configuration parameters can include IP addresses, directory locations, and execution paths and the like. Authorization to configure or reconfigure parameters can be allocated to specific end users or support groups.

Figure 3:
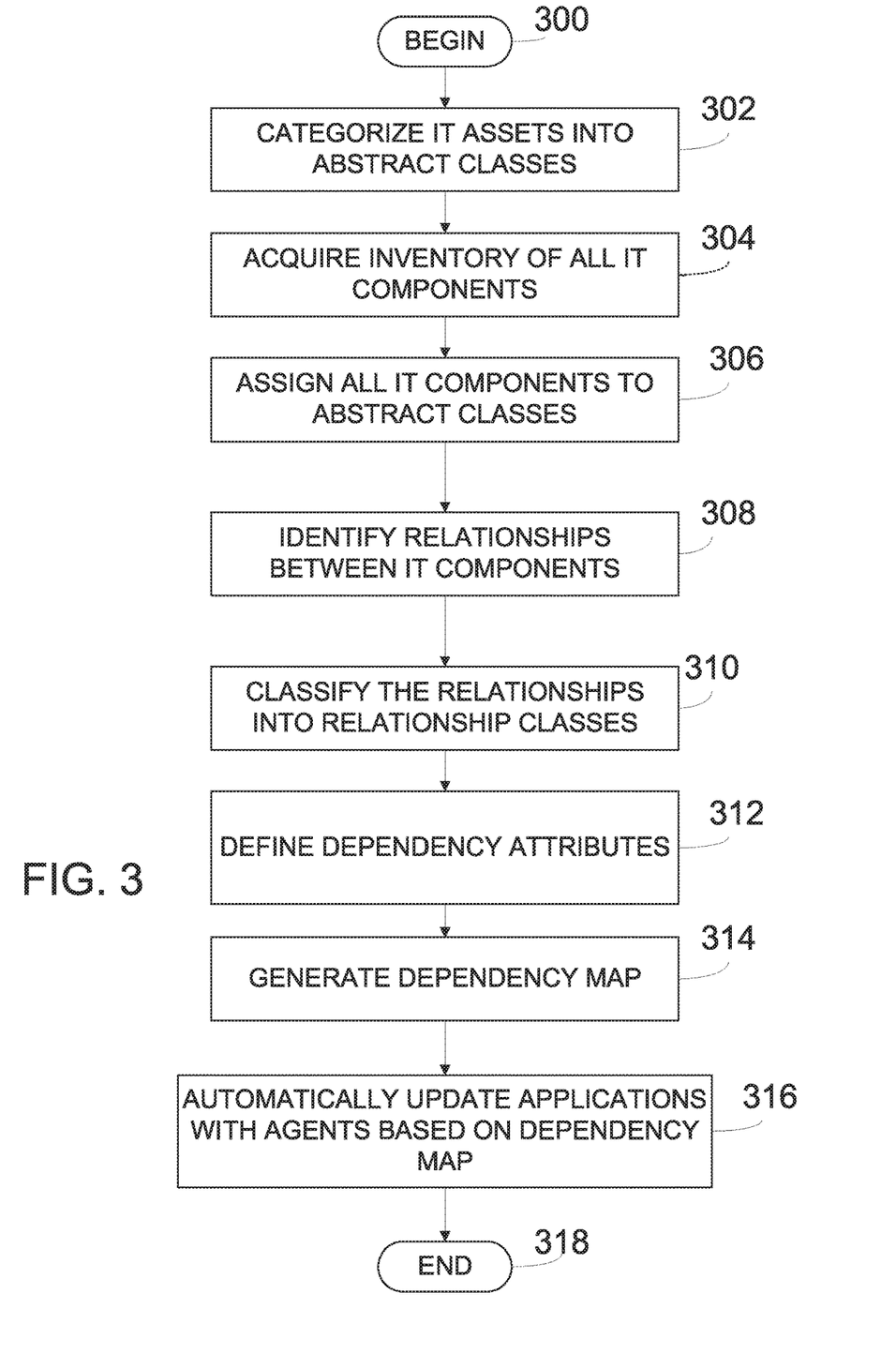
FIG. 3 is a flow chart of an embodiment of a method of change management in an IT system according to the present invention.

FIG. 3 is a flow chart of an embodiment of a method of change management in an IT system according to the present invention. In step 300, the method begins. In step 302, IT assets of an organization are categorized into the various abstract component classes shown in FIG. 2. In step 304 an inventory of all components contained within the IT system is assembled and, in step 386, the components are assigned under the abstract classes. The assembly of the inventory of components can be automated using inventory management applications known in the art, such as HOPEX by Mega International, or by employing scanning scripts of well-defined components such as network switches, servers and workstations. Additionally, or alternatively, inventories can be obtained by non-centralized contributions from IT support teams within the organization. Table I presented below is an example inventor listing of IT components categorized under the abstract classes.

TABLE 1

| ABSTRACT CLASS | COMPONENTS |
|---|---|
| FACILITY | a. Primary data center |
|  | b. Backup data center |
|  | c. Disaster recovery center |
|  | d. Main power source |
|  | e. Backup power source |
| HARDWARE | a. Physical hosting server P101 |
|  | b. Virtual server V101 |
|  | c. Virtual server V102 |
|  | d. Network switch N101 |
|  | e. Client machine C101 |
| MIDDLEWARE | a. Relational database manager DB101 |
|  | b. Software licensing service L101 |
|  | c. Software licensing service L102 |
|  | d. Remote visualization service R101 |
| SOFTWARE | a. Software S101 |
|  | b. Software S102 |
| CONFIGURATION PARAMETERS | a. IP address of Virtual server V101 |
|  | b. Configuration directory of Software S101 |
|  | c. Execution path of Software S102 |
| HUMAN CONSUMERS | a. Servers Support |
|  | b. Geological applications support |
|  | c. Geological interpretation users |
|  | d. Geological modeling users |

Figure 4:
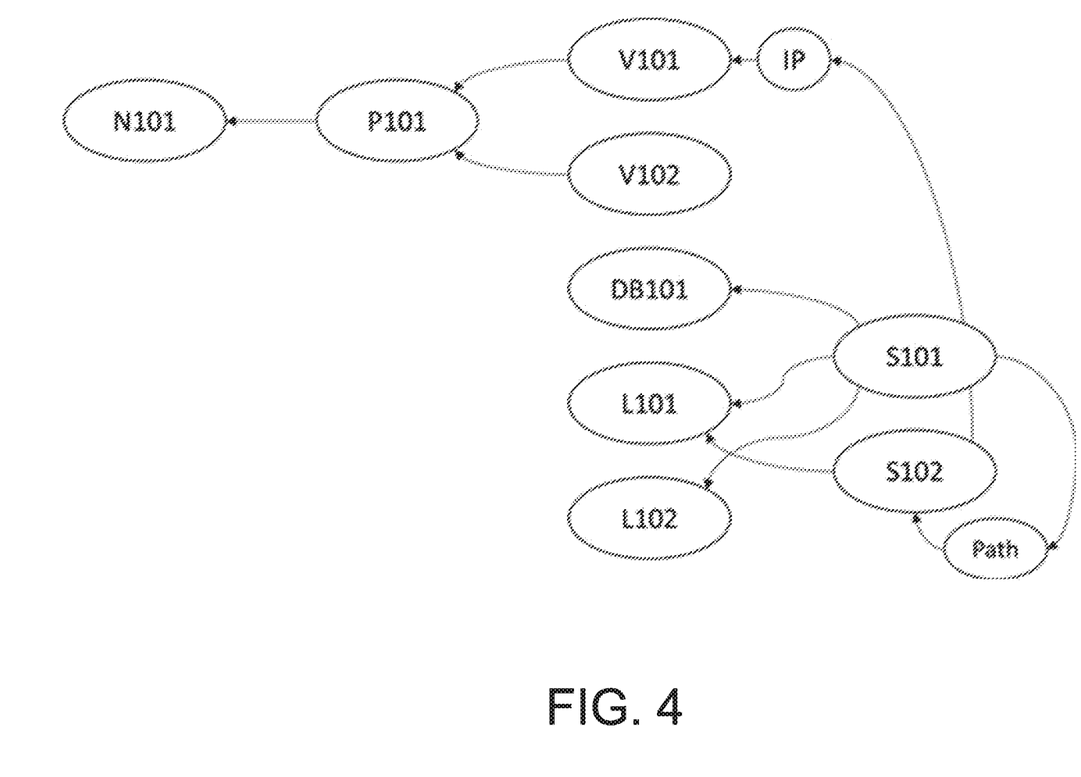
FIG. 4 is a dependency graph representation of the example relationships presented in Table II herein.

In step 308 of the method, relationships between the components, within and across abstract classes, are determined. The relationships are characterized as dependent-dependee, in which the dependent component is dependent upon (i.e., requires the active functioning of) the dependee component. Table II includes example of relationships between the listed components of the IT system. FIG. 4 is an exemplary graph representation of the relationships presented in Table II. In FIG. 4, the arrows point from the dependent components toward the dependee components. For example, physical server P101 depends upon the operational status of network switch N101, and an arrow accordingly points from P101 to N101. Physical server 101 hosts virtual servers V101, and V102 and therefore V101 and V102 are dependent upon P101 as shown. Virtual server V101 includes an IP address parameter (IP) which is considered as a dependent configuration parameter of virtual server V101.

A different set of relationships is based on middleware including a relational database manager DB01, a first software licensing service L101, and a second licensing service L102. Software S101 depends upon the first licensing service L101 and second licensing service L102, which indicates, for example, that the license services L101 and L102 must authorize the use of software S101. Software S102 depends only on licensing service L101 (e.g., for authorization) as well as relational database manager DB01, which indicates that software S101 can require and/or utilize information and/or functionality provided by the relationship database manager DB01. Software S102 depends on the IP address (IP) of virtual server V101. In addition, a "Path" node connects software S101 to S102, indicating that S101 depends on S102.

TABLE II

| Dependent | Dependee |
|---|---|
| Physical hosting server P101 | Network switch N101 |
| Virtual server V101 | Physical hosting server P101 |
| Virtual server V102 | Physical hosting server P101 |
| IP address of virtual server V101 | Virtual server V101 |
| Execution path of Software S102 | Software S102 |
| Software S101 | Relational database manager DB101 |
| Software S101 | Software licensing service L101 |
| Software S101 | Software licensing service L102 |
| Software S102 | Software licensing service L101 |
| Software S102 | IP address of virtual server V101 |
| Software S101 | Execution path of Software S102 |

After establishing the direction of dependency between the IT components, each dependency (each arrow shown in FIG. 4) is classified in terms of a relationship type in step 310. The middle column of Table III below lists the relationship classification of the dependencies of the IT components. As indicated in the Table, the dependency of physical hosting server P101 on network switch N101 is defined by a physical connection relationship with network switch N101. Virtual servers V101, V102 are dependent upon physical server P101 in that they are hosted in the physical server; an outage of the physical server would shut down the virtual servers. The IP address of virtual server V101 (IP) is a configuration of the virtual server. In this manner, configuration parameters of the various hardware components are considered to depend upon the hardware (or software) components; this relationship maintains the link between the configuration parameters and the hardware or software components for change management. Another configuration parameter is the "Path" node shown in FIG. 4 which points to software S102. This parameter defines the execution path (instructional sequence for execution) of Software S102. Other relationships are classified as "points to", in which the dependent component points to a dependee component that, for example, supplies information, authorization data, or other instructions for the dependent component. In FIG. 4, software S101 points to both relational database manager DB101, software licensing service L101 and software licensing service L102. During execution, software S101 can obtain data from relationship database manager DB101 and authorizations from software licensing services L101, L102. Similarly, software S102 points to software licensing service L101. Software S102 also points to the IP address of virtual server V101 indicating that software uses this configuration parameter during execution (e.g., for communication with virtual server V101). Last, software S101 also point to software S102, which indicates that execution of software S101 relies upon the execution path of software S102.

TABLE III

| Dependent | Relationship Type | Dependee |
|---|---|---|
| Physical hosting server P101 | Physically connected to | Network switch N101 |
| Virtual server V101 | Hosted in | Physical hosting server P101 |
| Virtual server V102 | Hosted in | Physical hosting server P101 |
| IP address of virtual server V101 | Configuration of | Virtual server V101 |
| Execution path of Software S102 | Configuration of | Software S102 |
| Software S101 | Points to | Relational database manager DB101 |
| Software S101 | Points to | Software licensing service L101 |

TABLE III-continued

| Dependent | Relationship Type | Dependee |
|---|---|---|
| Software S101 | Points to | Software licensing service L102 |
| Software S102 | Points to | Software licensing service L101 |
| Software S102 | Points to | IP address of Virtual server V101 |
| Software S101 | Points to | Execution path of Software S102 |

Figure 5:
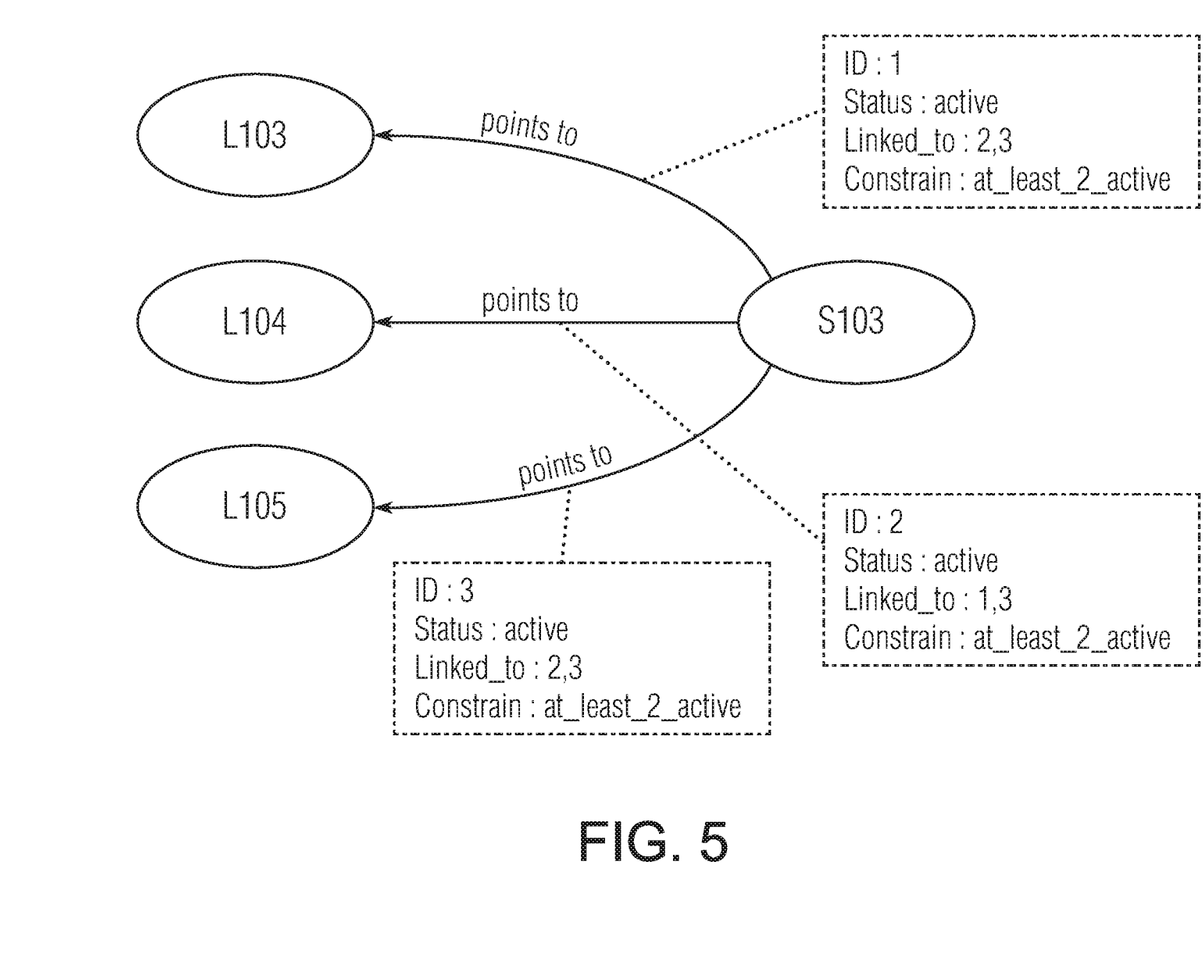
FIG. 5 is a dependency graph representation of example of cross-relationships and dependency attributes between several components.

Returning again to FIG. 3, in the following step of the method 312, attributes of the dependencies are defined. The attributes include at least: i) a dependency ID which uniquely identifies each dependency; ii) a status, which is either active, meaning that a failure or an outage of the dependee component will affect the dependent component, or passive, in which case an outage or failure it will not affect the dependent component; iii) dependency links which include IDs of cross-related dependencies; and iv) interdependency constraints, which sets a number of related dependencies that must have active status to maintain an operational status of the dependent. Other attributes can be defined and included as well. FIG. 5 is a graph representation illustrating example cross-relationships and dependency attributes between a software component S103 and three software license servers L103, L104 and L105. In the graph a first dependency (ID:1) is shown pointing from S103 to L103. The status of the first dependency is active, it is linked to dependencies with ID:2 and ID:3 and has the constraint that at least two of the cross-linked dependences (i.e., ID:1, ID:2 and ID:3) must be in an active state to maintain operability of software S103. Similarly, the second dependency (ID:2) is shown pointing from S103 to L104. The status of the second dependency is active, it is linked to dependencies with ID:1 and ID:3 and also has the constraint that at least two of the cross-linked dependencies must be in an active state to maintain operability of software S103. The third dependency (ID:3) points from S103 to L105. The status of the third dependency is active, it is linked to dependencies with ID:1 and ID:2 and has the same constraint as the other linked dependencies.

Figure 6:
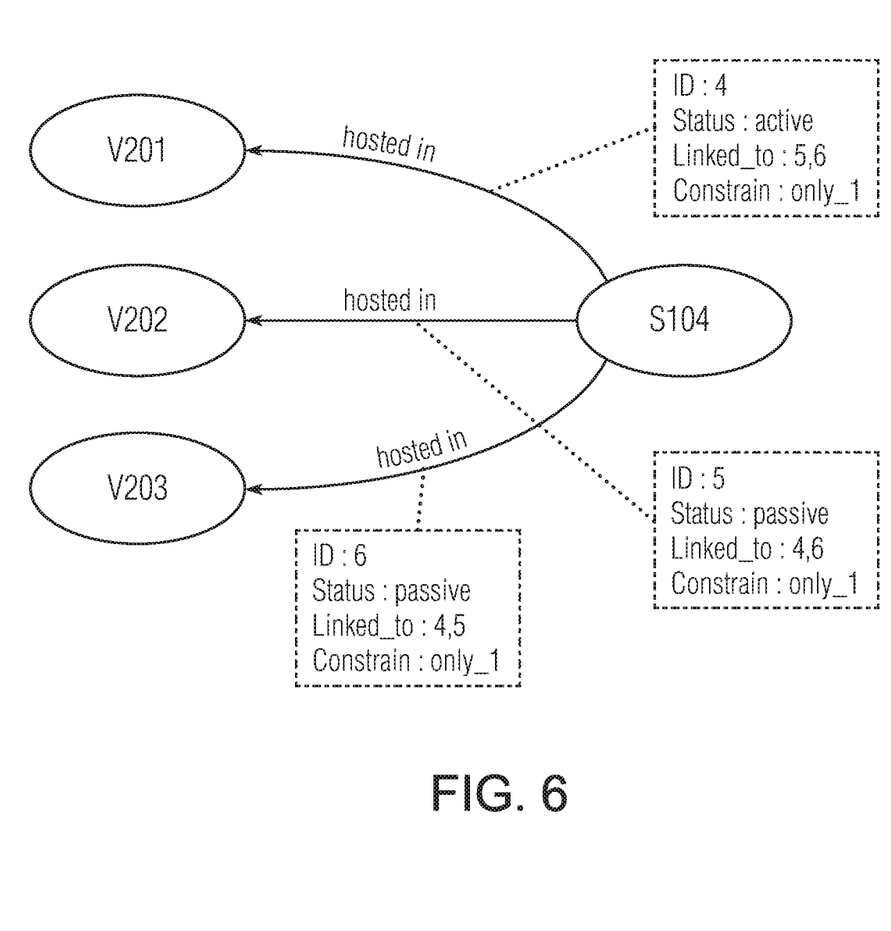
FIG. 6 is a dependency graph representation of another example of cross-relationships and dependency attributes between several components.

Another example of graph representation illustrating example cross-relationships and dependency attributes is shown in FIG. 6. Software S104 is hosted in virtual servers V201, V202 and V203. The first dependency, which is between S104 and V201 has attributes ID:4, an active status, cross-links to dependencies ID:5 and ID:6, and has the constraint that only one of the linked dependencies (i.e., ID:4, ID:5 and ID:6) needs to be active to maintain operability of software S104. In the example of FIG. 6, an outage in two of the three virtual servers will not affect operation of software S104. This constraint information is very useful for change management, in that is tracks dependencies that are critical for operation and dependencies that are redundant and less critical for system operation.

In the following step of the method 314, a change to a selected component is simulated by generating a dependency graph including the change and illustrating expected effects using code executing in the processor of the IT system. While dependency graphs such as the representations shown in FIGS. 4, 5 and 6 can be generated, other ways of depicting or describing the dependency relationships can be used via a programmed processor of the IT system. In general, change simulation involves a dependency mapping that illustrates all effects on IT components that are affected by the change according to their dependencies and cross-dependencies. The dependency mapping is searchable so that selected components of the mapping can be viewed.

With reference to the predefined dependency constraints, the system can display subsets of the dependency mapping showing the impacted components. For example, if component A is being changed, and component B solely depends on component A, the mapping will show that an outage on A will cause an outage on B. In another example, if component B depends on components A1, A2, and A3 with the constraint that B requires at least 2 of A1, A2, A3 to be active, then the dependency mapping will make clear that an outage on A1 will not impact B but with the proviso that A2 and A3 must remain active. The simulation also provides detailed impact analysis that utilize predefined impact classifications. For example, an outage on component C may cause either an outage, interruption, slowness or no impact on dependent components. These effects can all be defined as dependency attributes alongside the dependency constrains. The method ends in step 316.

Figure 7:
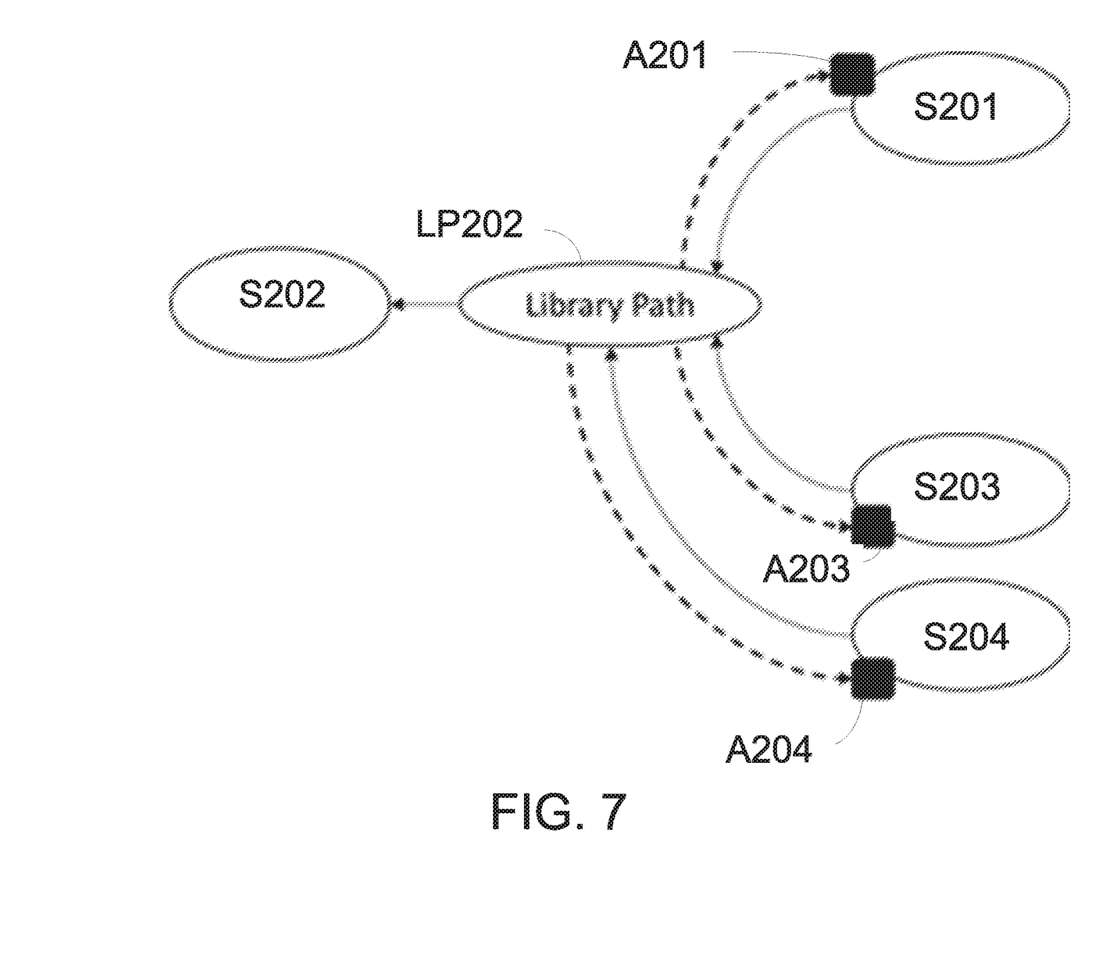
FIG. 7 is a dependency graph that illustrates a method for automatically updating IT components in a change rollout according to an embodiment of the present invention.

FIG. 7 is a schematic graph-based illustration of an automatic update performed according to an embodiment of the present invention. As shown in the figure, each of software applications S201, S203 and S204 can authenticate a respective agent A201, A203, A204. The agents A201, A203, A204 effectively "register" the associated software for the automatic update. By registering, the agents A201, A203, A204 are enabled to receive updated configuration parameters at the occurrence of an actual or simulated change. Examples of global configuration rollout to which automatic updates are especially suited include new domain system (DNS) addresses, changes to database schema names and modifications to shared library paths. It is to be appreciated that automatic rollouts are not limited to these particular updates and are applicable to other updates. In scenarios in which automatic update is not possible such as a configuration parameter in a vendor application which can only be changed manually by a human, agents A201, A203, A204 can register to send a notification for a manual update process that can be performed by support staff. In the example update illustrated in FIG. 7, software applications S201, S203, and S204 consume a library path LP202 provided by software S102. Once the agents A201, A203, A204 register for automatic updates, the agents are notified of any changes to the library path LP202. The agents A201, A203 and A204 then authenticate the change and automatically update the respective software applications S201, 203 and S204 to rollout the change to the library path LP202.

All IT components identified in the inventory is associated with a human support group or "owner" which is entered as a field during a data entry phase. The human support group/owner associated with an IT component or owner can subscribe for change approval by registering to be an approver for any change that could potentially cause an outage to the associated IT component. When a change is requested, and affected IT components are identified by code portions executing in the IT system, as described above, in order to identify the support group/owners associated with the affected components. The code can be further configured to cause a communication such as for example, and email, SMS message, phone communication, or other notification to be sent to support team/owners. The support team/owners can review the change and opt to either accept or reject the change. The support group/owner then can receive an update regarding the change request status. If all affected components' owners approve the change, then the change is approved. Any single rejection among the relevant approvers will prevent the requested change from being implemented.

During change simulation, if any two changes that occur during a common time frame share a common node or path (multiple common nodes), the changes can be identified as a "change conflict" and flagged for review. For conflicting changes to have final approval, an expert must review such conflict in addition to the normal approval process.

Figure 8:
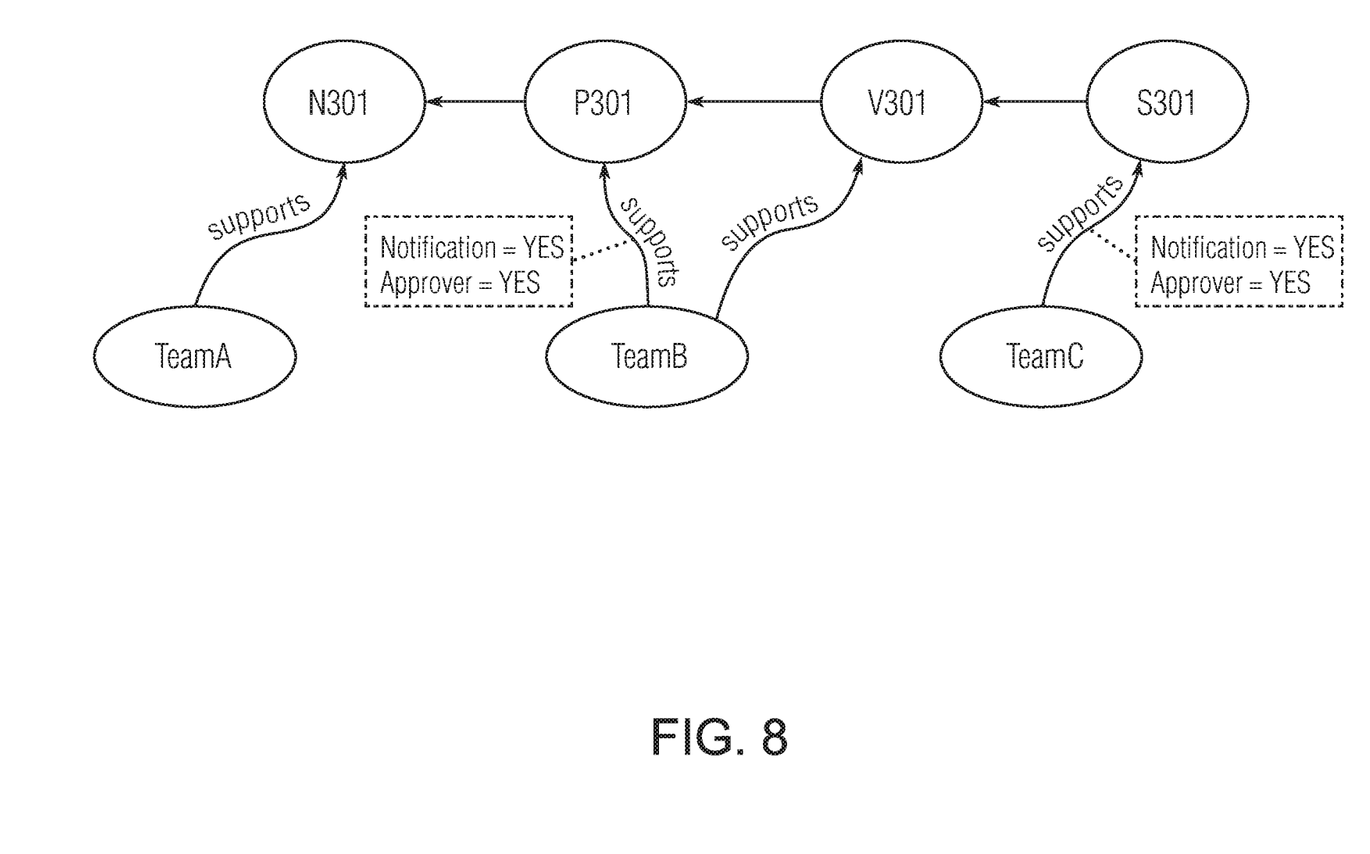
FIG. 8 is a schematic graph-based illustration of an example of a change approval process according to an embodiment of the present invention.

FIG. 8 is a schematic graph-based illustration of an example of a change approval process according to an embodiment of the present invention. In FIG. 8, a chain of related components is shown. Software S301 is hosted in virtual server V301, which is in turn hosted in physical server P301. Physical server P301 is physically connected to network switch N301. Support team A supports network switch N301, support team B supports physical server P301 and virtual server V301, support team C support software application S301. In addition, support team B is registered as an approver for changes to physical server P301, and support team C is registered as an approver for changes to software application S301. In this arrangement, an outage in network switch N301 can cascade through the physical server P301 and virtual server V301 to software application S301. Therefore, a change in the configuration of the network switch automatically generates approval requests from support team B and support team C. This example eliminates any interconnected relations to simplify the illustration of the change approval feature as part of this innovation.

The present system and method may be practiced on any computing device including a desktop computer, laptop computer, tablet computer, smart phone or other smart handheld device. The present system and method may also be implemented as a computer-readable medium that includes computer program code to enable one or more computer devices to implement each of the various process steps in a method in accordance with the present invention. It is understood that the terms computer-readable medium comprises one or more of any type of physical embodiment of the program code. In particular, the computer-readable medium can comprise program code embodied on one or more storage devices such as semiconductor cache memory, flash drives, optical discs, magnetic disk, tape, etc.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of managing a selected change to an IT (information technology) system, comprising:
   obtaining an inventory of all components available to the IT system using an automated inventory management process that gathers information regarding all assets of the IT system;
   assigning the components in the inventory to different levels of abstract component classes;
   identifying dependency relationships between the components in the IT system, wherein the dependency relationships between the components are classified by relationship type;
   defining attributes of the dependency relationships between the components;
   generating a complete dependency mapping of the components of the IT system based on the dependency relationships, cross-relationships and constraints;
   simulating the selected change within a processor of the IT system to one or more of the IT components using the dependency mapping to generate a change impact analysis;
   automatically updating impacted IT components via at least one authenticating agent executing on the IT system;
   identifying change conflicts if any two changes share a common node or path in the dependency mapping during a time frame;
   receiving a registration request to approve the change;
   generating an approval list required to implement the change upon receiving the registration request; and
   preventing the change from being implemented until the registration request to approve the change is received,
   wherein the constraints include a number of dependee nodes required to be active to ensure that an outage does not occur in a dependent node dependent upon the dependee nodes.

2. The method of claim 1, wherein the attributes defined include cross-relationships, constraints and status.

3. The method of claim 1, wherein one of abstract component classes is one of a facility, hardware, middleware, software, a configuration parameter, or a user group.

4. The method of claim 1, further comprising authenticating the at least one agent to receive an updated configuration parameter prior to automatically updating impacted IT components.

5. The method of claim 1, further comprising classifying the dependency relationships between the components by relationship type after identifying the dependency relationships.

6. The method of claim 5, wherein the relationship type includes categories: physically connected to, hosted in, configuration of, points to, supports and uses.

7. A non-transitory computer-readable medium comprising instructions which, when executed by a computer system, cause the computer system to carry out a method of managing a selected change to an IT (information technology) system including steps of:
- obtaining an inventory of all components available to the IT system using an automated inventory management process that is adapted to gather information regarding all assets of the IT system;
- assigning the components in the inventory to different levels of abstract component classes;
- identifying dependency relationships between the components in the IT system, wherein the dependency relationships between the components are classified by relationship type;
- defining attributes of the dependency relationships between the components;
- generating a complete dependency mapping of the components of the IT system based on the dependency relationships, cross-relationships and constraints;
- simulating the selected change within a processor of the IT system to one or more of the IT components using the dependency mapping to generate a change impact analysis;
- automatically updating impacted IT components via at least one authenticating agent executing on the IT system;
- identifying change conflicts if any two changes share a common node or path in the dependency mapping during a time frame;
- receiving a registration request to approve the change;
- generating an approval list required to implement the change upon receiving the registration request; and
- preventing the change from being implemented until the registration request to approve the change is received;
- wherein the constraints include a number of dependee nodes required to be active to ensure that an outage does not occur in a dependent node dependent upon the dependee nodes.

8. The non-transitory computer-readable medium of claim 7, wherein the attributes defined include cross-relationships, constraints and status.

9. The non-transitory computer-readable medium of claim 7, wherein one of abstract component classes is one of a facility, hardware, middleware, software, a configuration parameter, or a user group.

10. The non-transitory computer-readable medium of claim 7, further comprising instructions for causing the computer system to execute the step of authenticating the at least one agent to receive an updated configuration parameter prior to automatically updating impacted IT components.

11. The non-transitory computer-readable medium of claim 7, further comprising instructions for causing the computer system to execute the step of classifying the dependency relationships between the components by relationship type after identifying the dependency relationships.

12. The non-transitory computer-readable medium of claim 11, wherein the relationship type includes categories: physically connected to, hosted in, configuration of, points to, supports and uses.

* * * * *